United States Patent [19]
Tuck et al.

[11] Patent Number: 5,757,637
[45] Date of Patent: May 26, 1998

[54] POWER CONVERTER WITH STAR CONFIGURED MODULES

[75] Inventors: Colin John Tuck, Barrington Christchurch; David Alun James; Dennis Allan Chapman, both of Christchurch, all of New Zealand

[73] Assignee: Switchtec Power Systems Limited, Christchurch, New Zealand

[21] Appl. No.: 545,851

[22] PCT Filed: May 11, 1994

[86] PCT No.: PCT/NZ94/00044

§ 371 Date: Jun. 28, 1996

§ 102(e) Date: Jun. 28, 1996

[87] PCT Pub. No.: WO94/27357

PCT Pub. Date: Nov. 24, 1994

[30] Foreign Application Priority Data

May 11, 1993 [NZ] New Zealand .............. 247597

[51] Int. Cl.[6] .................................................. H02M 7/04
[52] U.S. Cl. ................................................ 363/125; 363/84
[58] Field of Search ............................ 363/40, 37, 44, 363/84, 95, 125; 307/105

[56] References Cited

U.S. PATENT DOCUMENTS

| | | | |
|---|---|---|---|
| 5,198,970 | 3/1993 | Kawabata et al. | 363/37 |
| 5,345,375 | 9/1994 | Mohan | 363/40 |
| 5,499,178 | 3/1996 | Mohan | 363/39 |

*Primary Examiner*—Adolf Berhane
*Attorney, Agent, or Firm*—Marshall, O'Toole, Gerstein, Murray & Borun

[57] ABSTRACT

A power converter including a star converter module network and a star resistive network. A feedback network monitors the voltage difference between the nodes of the star converter module network and the star resistive network, and provides a signal for each phase of an AC supply corresponding to the voltage difference. An output sensing means senses the output voltage across output terminals and produces a demand signal based on a comparison of the output voltage with a required value. A controller produces a control signal based upon this comparison for each phase, and the control signal is used to control a corresponding converter module. Applications include power converters for supplying an isolated supply from a multi-phase main supply not having a neutral connection.

14 Claims, 5 Drawing Sheets

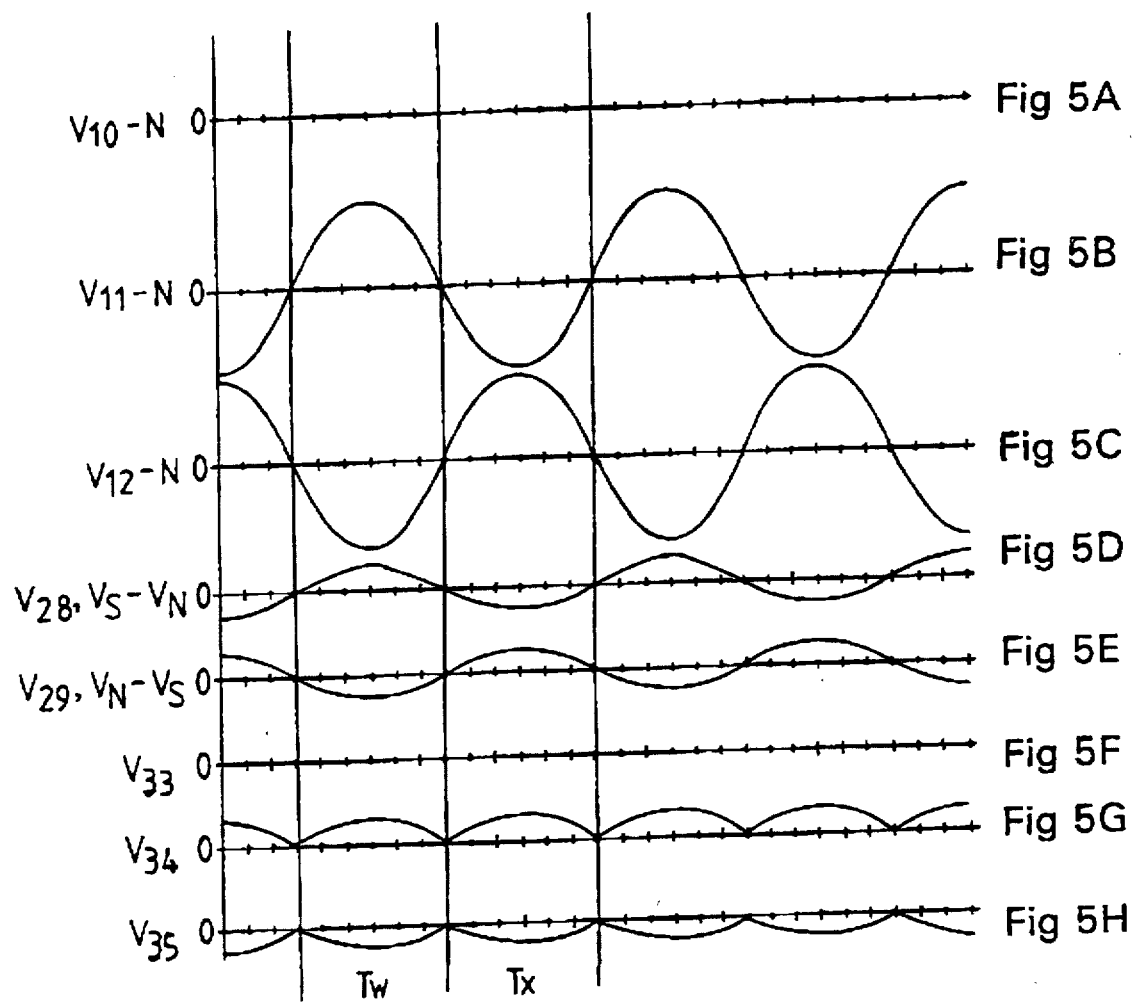

POWER CONVERTER WITH STAR CONFIGURED MODULES

TECHNICAL FIELD

The present invention relates to a power converter for supplying an isolated supply or other electrical source from a multiphase mains supply not having a neutral connection. More particularly, but not exclusively, the present invention relates to a power converter in which converter modules are connected in star configuration and the node voltage is compared with the node voltage of a star network in parallel to the converter modules to provide feedback signals for each converter module to ensure balanced operation.

BACKGROUND TO THE INVENTION

Referring to FIG. 1, typical prior art power conversion equipment for high power applications is shown. 3 phase lines 1, 2, 3 supply three phase power to AC to DC converter modules 4, 5 and 6. The outputs of the converter modules 4, 5 and 6 are combined via combiner 7 to provide a DC supply for a load 8 or battery etc. In this case a neutral line 9 is also provided. This ensures that the arrangement remains stable with any unbalanced currents being returned through the neutral wire 9.

Many electricity supply authorities prefer not to supply a neutral connection. If the neutral connection 9 is removed from the arrangement of FIG. 1 it becomes unstable unless the star point junction of 4,5 and 6 is somehow made to behave as if it were a neutral point.

DISCLOSURE OF THE INVENTION

It is an object of the present invention to provide a stable power converter for a multiphase power supply that may not be supplied with a neutral line, or at least to provide the public with a useful choice.

According to one aspect of the invention there is provided a power converter for producing an output supply from a multiphase AC supply which may not have a neutral connection, said power converter having AC input terminals for each phase of said AC supply and output terminals, said power converter further comprising:

(i) a plurality of converter modules, AC inputs of said converter modules being connected between said AC terminals in a star configuration, outputs of said converter supplying output power to said output terminals;

(ii) a star network connected across the AC input terminals in parallel with the star connected converter modules;

(iii) output sensing means which monitors the output voltage across said output terminals, compares this with a required value and produces a demand signal related thereto;

(iv) feedback means which monitors the voltage difference between the node of said star connected converter modules and the node of said star network and produces output signals for each phase representative of the monitored voltage difference for each phase; and (v) control means which combines the output signals of said feedback means for each phase with the demand signal of said output sensing means to provide a control signal for each phase which is supplied to a control input of each converter.

Preferably the star network consists of a network of equal value impedances. These impedances shall be substantially resistive. Preferably a combiner combines the output of said converter modules and supplies the combined output to said output terminals. The output supply can be AC or DC.

BRIEF DESCRIPTION OF THE DRAWINGS

Further aspects of this invention, which should be considered in all its novel aspects, will become apparent from the following description, given by way of example of possible embodiments thereof, and in which reference is made the accompanying drawings wherein:

FIGS. 5A–5H illustrate the operation of the feedback circuitry of the power converter in FIG. 2 for two phases of AC input.

BEST MODE FOR CARRYING OUT THE INVENTION

Figure 1:
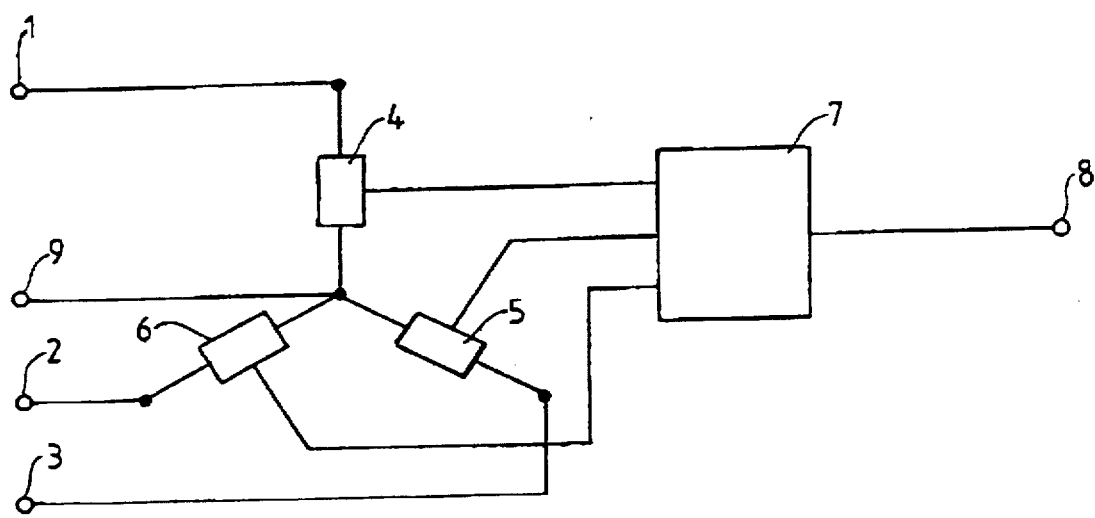
FIG. 1: shows diagrammatically a prior art arrangement suitable for use with a multiphase power supply including a neutral connection.
Figure 2:
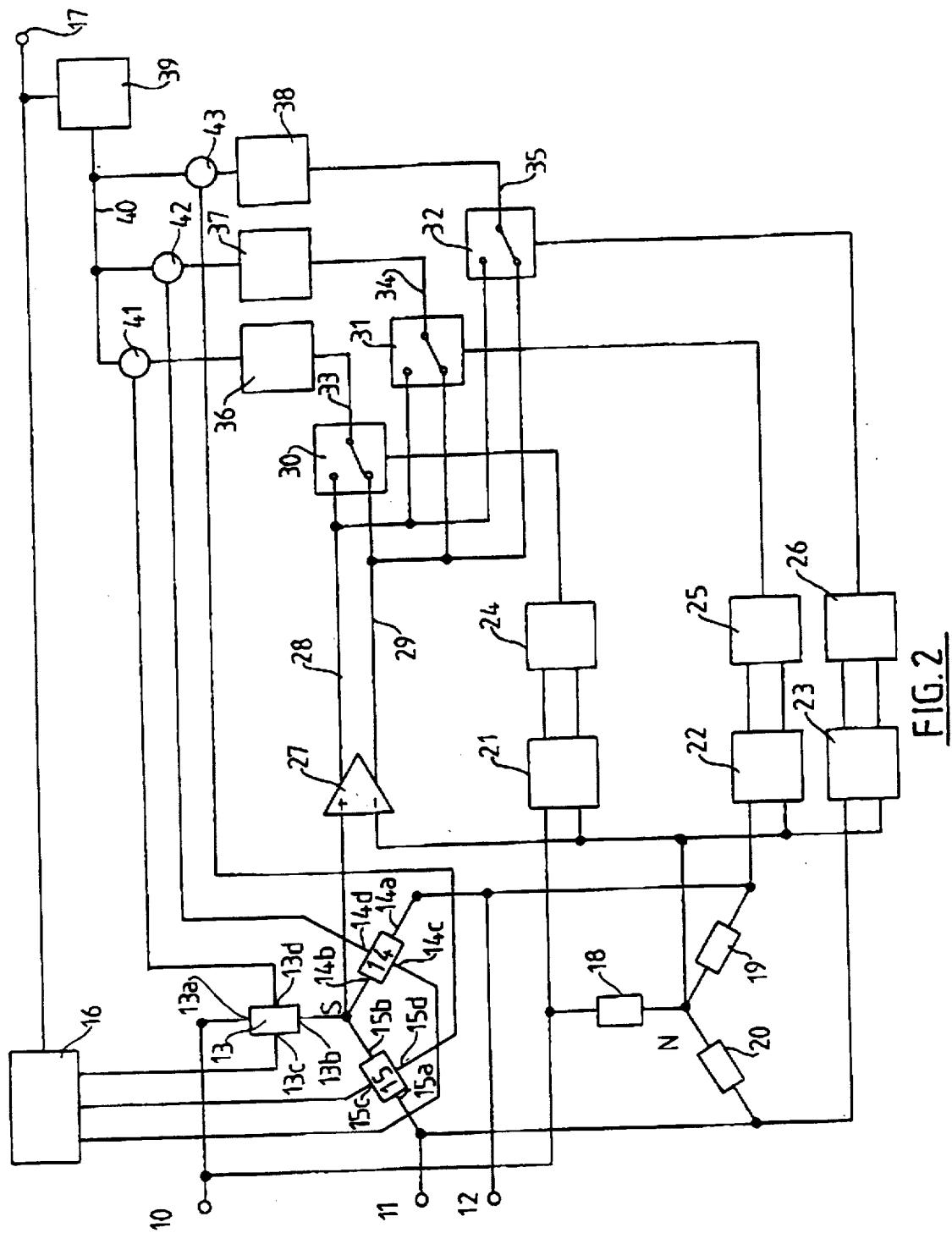
FIG. 2: shows a block diagram of a power converter which produces a DC output according to a first embodiment of the invention.

Referring firstly to FIG. 2 a preferred embodiment producing a DC output, is shown. AC input terminals 10, 11, 12 are in use connected to a three phase AC supply having no neutral connection. Converter modules 13, 14 and 15 are connected in a star configuration across AC input terminals 10, 11 and 12. A node S is defined at the centre of the star connected converter modules. Converter modules 13, 14 and 15 have AC input terminals 13a, 13b, 14a, 14b, 15a and 15b and DC outputs 13c, 14c and 15c. The DC outputs of the converters 13c, 14c and 15c are combined by combiner 16 which supplies the required DC output to DC output terminal 17.

The star balance circuit only works due to the continuous nominally sinusoidal nature of the input current to each module. That is because of the resistive input characteristics, or put another way the impedances 18, 19, 20 are similar in nature to the impedances presented by converters 13, 14, 15, at the A.C. supply frequency i.e. resistive.

A star network consisting of impedance elements 18, 19 and 20 is connected in parallel to the star network of converter modules 13, 14 and 15 across AC input terminals 10, 11 and 12. Elements 18, 19 and 20 are preferably substantially resistive impedances of equal values. Node N is defined at the intersection of elements 18, 19 and 20. The voltage at node N represents a reference neutral voltage as the substantially resistive impedance elements 18, 19 and 20 are all equal. The voltage at node N represents the voltage node S should be at if the converter modules 13, 14 and 15 are each drawing power in a desired resistive fashion i.e. current proportional to voltage across the converter. To ensure stable operation the voltage at node S should be brought as close as possible to the voltage at node N. The manner in which the invention achieves this will now be described.

Voltage sensors 21, 22 and 23 sense the voltages across substantially resistive impedance elements 18, 19 and 20 respectively. The output voltage of voltage sensors 21, 22 and 23 are supplied to zero crossing detectors 24, 25 and 26. The inputs to zero crossing detectors 24, 25 and 26 are usually generally sinusoidal shaped waveforms. Zero crossing detectors 24, 25 and 26 produce square wave outputs in response to these input voltages. The output of zero crossing detectors 24, 25 and 26 are a high logic level when the voltages from voltage sensors 21, 22 and 23 are positive and the outputs are logic low when the voltages are negative.

Difference amplifier 27 compares the voltage at node S with the voltage at node N. The voltage at node S is supplied to the non-inverting terminal of differential amplifier 27 and the voltage at node N is supplied to the inverting terminal of differential amplifier 27. Output 28 of differential amplifier 27 is a non-inverted output representative of the difference between the voltage at node S minus the voltage at node N. Output 29 is inverted and is representative of the voltage at node N minus the voltage at node S.

Both the non-inverted output 28 and the inverted output 29 are supplied to synchronous switches 30, 31 and 32. Synchronous switches 30, 31 and 32 switch their outputs 33, 34 and 35 between the non-inverted output 28 and the inverted output 29 dependent upon the output signals of zero crossing detectors 24, 25 and 26. When the output of zero crossing detector 24 is high, synchronous switch 30 switches to non-inverting output 28, so that its output 33 is that of non-inverting output 28. When the output of zero crossing detector 24 is low, synchronous switch 30 switches to the output on line 29, hence the output of synchronous switch 33 is that of inverting output 29.

Likewise, synchronous switches 31 and 32 connect their outputs 34 and 35 to non-inverting output 28 when a high logic signal is received from zero crossing detectors 25 and 26, and switch their outputs 34 and 35 to be connected to inverting output 29 when low logic signals are received from zero crossing detectors 25 and 26.

Figure 3:
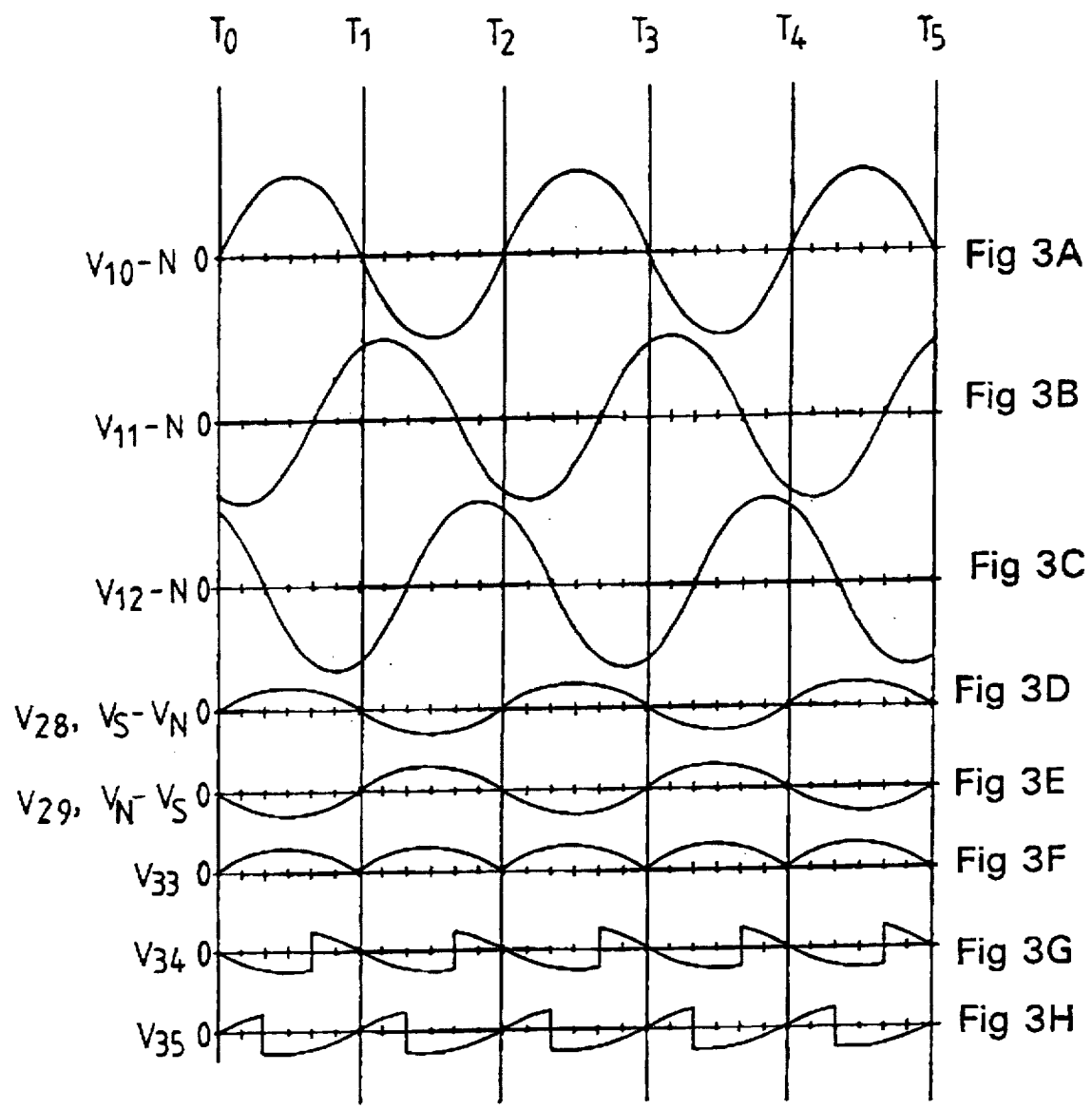
FIGS. 3A–3H illustrate the operation of the feedback circuitry of the three phase converter of FIG. 2.

This arrangement ensures that the outputs on lines 33, 34 and 35 relate to the voltage displacement between nodes S and N for converters 13, 14 and 15 respectively. This will be described by way of example with reference to FIGS. 3A–3H. FIGS. 3D–3E show the outputs 28 and 29 respectively of differential amplifier 27 where the voltage across converter 13 is less than that across element 18. From time T0 to T1 zero crossing detector 24 produces a high logic output and so synchronous switch 30 connects its output 33 to non-inverting output line 28. From period T1 to T2 zero crossing detector 24 has a low logic output and so the output 33 of synchronous switch 30 is connected to the inverting terminal 29 of differential amplifier 27. It can thus be seen that the output voltage between T0 to T5 will be a continuous positive ripple as shown in FIG. 3F. If the voltage across converter 13 was greater than that across element 18 it can also be shown that a negative ripple would result.

Conditioning is required to provide an appropriate DC control signal to the converter modules 13, 14, 15.

The outputs 33, 34 and 35 of synchronous switches 30, 31 and 32 are supplied to low pass filters and amplifiers 36, 37 and 38 to produce a DC control signal having greatly reduced ripple. Output sensor 39 compares the measured DC output with a desired value and outputs a demand signal on line 40 related to the difference between the measured and desired values. The output demand signal 40 provides feedback to the converter modules 13, 14 and 15 to adjust their outputs to achieve the desired combined DC output. The output from low pass filters and amplifiers 36, 37 and 38 represent the feedback signals for each converter module to achieve balanced operation. Demand signal 40 and the outputs of low pass filters and amplifiers 36, 37 and 38 are combined in summers 41, 42 and 43. The output for each phase is supplied to the respective control input of each converter 13d, 14d, 15d.

Thus the control signals to each converter module contain two components. The first component is related to the measured DC output of the converter and indicates whether the converter as a whole must increase or decrease its output. The second component represents whether each converter module should increase or decrease its output to bring the voltage at node S closer to the voltage at node N to achieve balanced operation.

If one phase is lost, for example if converter module 13 fails, more than 60% of the original power would be available if the supply line feeding the failed or inactive converter is isolated from the circuit.

This isolation may be effected using switches positioned between both converter module 13 and element 18 and the supply line 10. Similarly, switches located between both converters 14, 15, and elements 19, 20 and their respective supply lines would allow effective two phase operation.

In two phase operation, the voltage between the phases at inputs 11 and 12 will now be shared between substantially resistive impedance elements 20 and 19. In a manner similar to that described in respect of the three phase balance, the balancing circuit will act to make the voltages at node S and at N equal, thereby resulting in voltage sharing between power converters 14 and 15.

Referring to FIGS. 5A–5H and 2. The circuit waveforms are shown for the case where converter 14 is through-putting more power than converter 15. If uncorrected the voltage across 14 will tend to collapse and that across 15 increase. During interval TW switch 32 connects 29 to 35. This produces the negative ripple shown as V35.

This signal, V35, after filtering in 38 and combined in 43 will be used to reduce the throughput power of 14. A similar sequence of events causes the positive ripple shown as V34.

As the through-put power of converters 14 and 15 are brought closer together the magnitudes of V34 and V35 will reduce until at balance they will be zero.

Figure 4:
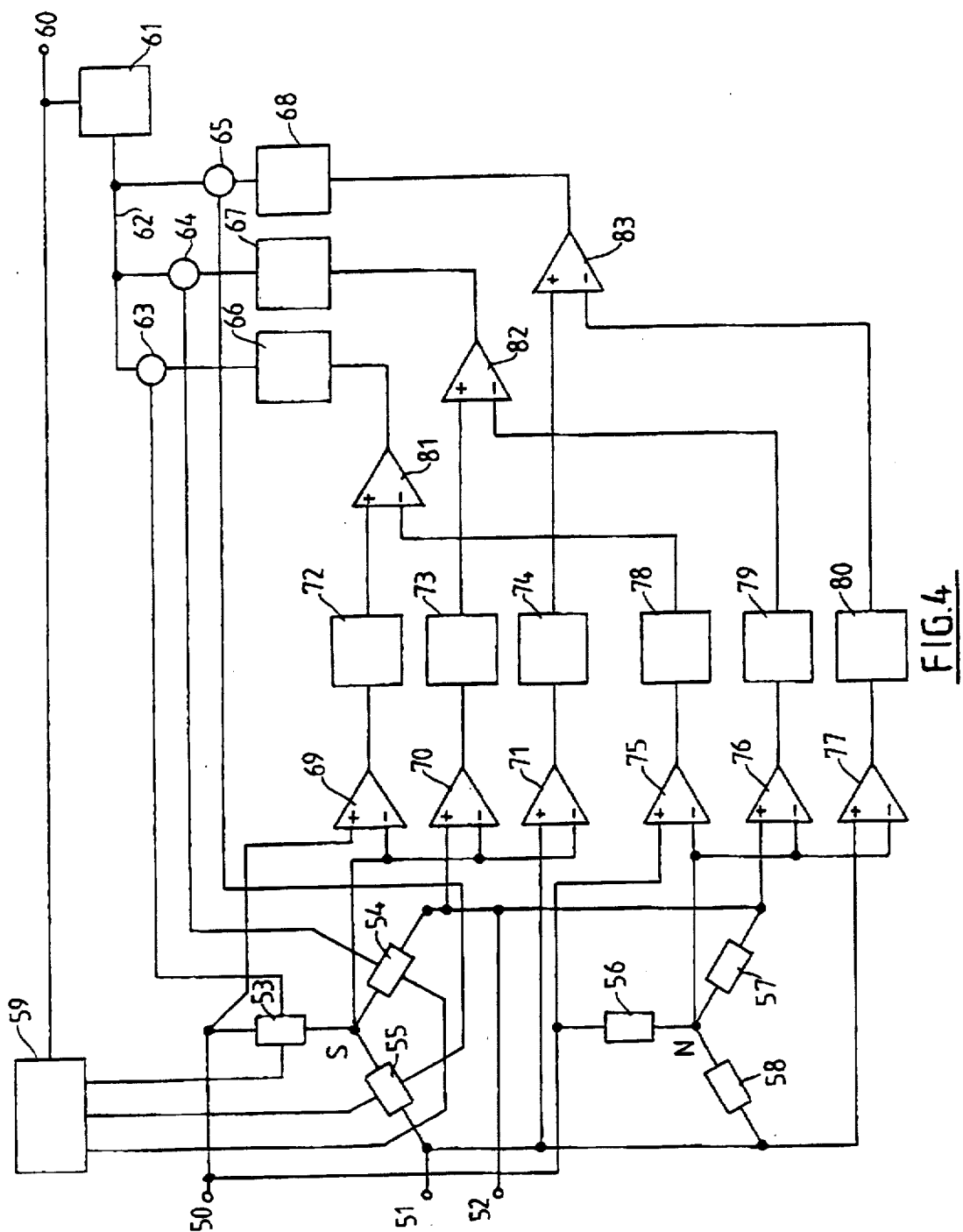
FIG. 4: shows a block diagram of a power converter according to an alternate embodiment of the invention.

Referring now to FIG. 4, an alternate embodiment of the invention is shown. This embodiment is similarly implemented so as to produce a DC output. As in the previous embodiment converter modules 53, 54 and 55 are connected in a star configuration across AC input terminals 50, 51 and 52 (a three phase supply with no neutral). A star network consisting of components 56, 57 and 58 is again connected in parallel across the star network formed by converter modules 53, 54 and 55. The DC outputs of converter modules 53, 54 and 55 are again combined by a combiner 59 to produce the required DC output at DC output terminal 60. An output sensor 61 senses the voltage at the output DC terminals, compares this with a desired value and supplies a demand signal via lines 62 to summers 63, 64 and 65. Low pass filters and amplifiers 66, 67 and 68 supply the feedback phase components as per low pass filters and amplifiers 36, 37 and 38 of FIG. 2. These signals are combined by summers 63, 64 and 65 which supply the required control signals to converter modules 53, 54 and 55. It is to be appreciated that the control signals from the low pass filter and amplifier modules will be appropriately scaled in relation to the output 62 of DC output sensing means 61 to ensure stable operation. The operation of the converter so far described is the same as the converter of FIG. 2. The different technique for providing the feedback signals for each phase employed in this embodiment will now be described.

Each differential amplifier 69, 70 and 71 has its inverting terminal connected to the node S of the converter modules.

The non-inverting inputs of differential amplifier 69, 70 and 71 are connected to AC input terminals 50, 51 and 52. Each differential amplifier 69, 70 and 71 produces an output proportional to the magnitude of the voltage across respective converter modules 53, 54 and 55. This output is full wave rectified by a full wave rectifiers 72, 73 and 74.

AC input terminals 50, 51 and 52 are also connected to the non-inverting inputs of respective differential amplifiers 75, 76 and 77. In this case however, the inverting inputs of differential amplifiers 75, 76 and 77 are connected to node N of a substantially resistive impedance network 56, 57 and 58. The outputs of differential amplifiers 75, 76 and 77 represent the ideal voltage magnitude in each phase where power is being drawn proportionately to the applied voltage. The outputs of differential amplifiers 75, 76 and 77 are full wave rectified by full wave rectifiers 78, 79 and 80.

Differential amplifier 81 compares the magnitude of the output of full wave rectifier 72 with the output of full wave rectifier 78. The output of differential amplifier 81 represents the difference between the actual voltage across converter 53 and the ideal voltage across converter 53 (i.e.: the voltage across resistor 56 represents the desired voltage across 53 which gives the desired power sharing). The output of differential amplifier 81 thus represents an error signal for module 53 which is fed back to the control input of converter 53 to ensure that the converters draw power in proportion to the ideal applied voltage. The differential amplifiers 82 and 83 likewise produce error signals for the other two converter modules 54 and 55 (i.e. the other two phases).

The error signals from differential amplifiers 81, 82 and 83 are filtered and scaled by low pass filters and isolation amplifiers 66, 67 and 68. The error signals for each phase from low pass filters and isolation amplifiers 66, 67 and 68 are combined with the demand signal from DC output sensing means 61 by summers 63, 64 and 65 and supplied to the control input of each converter module.

Differential amplifiers 81, 82 and 83 will in practice be incorporated with low pass filters 66, 67 and 68. They are shown separately in FIG. 4 for ease of comparison with FIG. 2.

It will thus be seen that if the voltage across converter module 53 is lower than the voltage across substantially resistive impedance 56 (i.e.: module 53 is drawing more power than for ideal balanced operation) the output of differential amplifier 81 will be negative so that the control input to converter module 53 will be reduced to decrease the load drawn by that module. If on the other hand the voltage across module 53 is higher than the voltage across substantially resistive impedance 56 the output of comparator 81 will be positive and will add to the demand signal 62 to increase the power drawn by converter module 53 compared to that which would otherwise have been drawn without the feedback control of the invention.

It will thus be seen that DC output sensor 61 produces demand signal 62 representative of the level of output required by the converter modules 53, 54 and 55 to produce the required DC supply. This demand signal is modified for each phase by the feedback method of the invention to ensure that the available power is evenly drawn by each converter. This provides stable converter operation when no neutral connection is supplied.

It is also noted that both circuits shown in FIGS. 2 and 4 may be readily modified to produce an AC output if so desired.

INDUSTRIAL APPLICABILITY

Although the power converter of the present invention may find wide application in a variety of power supply equipment, it may be seen that the power converter is particularly suitable for use in telecommunications rack power systems. The power converter of the present invention may find particular application in situations where there may not be a neutral connection provided.

We claim:

1. A power converter comprising:

AC input terminals for each phase of an AC supply;

output terminals;

a plurality of converter modules having AC inputs and outputs, the AC inputs of each converter module being connected between said AC input terminals in a star configuration having a node, the outputs of each converter module supplying output power to each output terminal;

a star network of substantially resistive impedances connected across the AC input terminals in parallel with the star connected converter modules, the star network having a node;

output sensing means for sensing an output voltage across said output terminals, for comparing the output voltage with a required values and for producing a demand signal related thereto;

feedback means for monitoring a voltage difference between the node of said star connected converter modules and the node of said star network and for producing output signals for each phase representative of the monitored voltage difference for each phase; and control means for combining the output signals of said feedback means with the demand signal of said output sensing means to provide a control signal for each phase and for supplying the control signal to a control input of each converter module.

2. A power converter as claimed in claim 1 where the star network consists of a network of substantially equal value resistive impedances.

3. A power converter as claimed in claim 1 or claim 2 where a combiner combines the output of said converter modules and supplies the combined output to said output terminals.

4. A power converter as claimed in claim 1 where said feedback means comprises a difference amplifier and, for reach phase, a low pass filter, a synchronous switch, a zero crossing detector and a voltage sensor, characterized in that a signal representing the voltage difference between the voltage at said node of said star connected converter modules and the voltage at said node of said star networks and a voltage representing the inverse of such a signal, are supplied to said synchronous switches, which are responsive to signals from a corresponding zero crossing detector, said zero crossing detector being in turn responsive to a said voltage sensor which senses a polarity of a voltage across a component of the star network, the synchronous switch thereby producing a switching signal corresponding to each phase, the output of each of said synchronous switches feeding a low pass filter to reduce ripple, and thus providing the desired feedback signals.

5. A power converter as claimed in claim 1, wherein said feedback means comprises a low pass filter, one first differential amplifier, three second differential amplifiers and three full wave rectifiers corresponding to each phase, characterized in that said second differential amplifiers sense the voltage across each of the converter modules and each of the components which constitute the star network, the output of said second differential amplifiers being full wave rectified, whereby each full wave rectified converter module voltage is compared with a corresponding full wave rectified star network component voltage by a first differential amplifier whereby the output represents the difference between the actual voltage across each converter and the ideal voltage across each converter, the output from each differential amplifier is fed into a low pass filter to reduce ripple, producing an output corresponding to the desired feedback signals.

6. A power converter as claimed in claim 5 where the first differential amplifiers which are responsive to the full wave rectifiers, are incorporated with the low pass filters.

7. A power converter as claimed in claim 1 wherein said power converter includes means for selectively isolating the AC inputs from the corresponding power converters and substantially resistive impedance elements.

8. A power converter as claimed in claim 1 wherein said power converter includes means for selectively isolating any single AC input from its corresponding power converter and substantially resistive impedance element.

9. A power converter as claimed in claim 1 wherein two phases of AC supply are provided for.

10. A power converter comprising:

AC input terminals for each phase of an AC supply;

output terminals;

a plurality of converter modules having AC inputs and outputs, the AC inputs of each converter module being connected between said AC input terminals in a star configuration having a node, wherein the node of the star connected converter modules has a voltage, and wherein the outputs of the converter module supply output power to the output terminals;

a star network of substantially resistive impedances connected across the AC input terminals in parallel with the star connected converter modules, wherein the star network has a node, and wherein the node of the star network has a voltage;

monitoring means for monitoring a voltage difference between the voltage at the node of said star connected converter modules and the voltage at the node of said star network, and for producing output signals for each phase representative of the monitored voltage difference for each phase; and, controlling means responsive to the output signals for controlling each converter module so that the voltage at the node of the star connected converter modules is substantially equal to the voltage at the node of the star network.

11. A power converter comprising:

AC input terminals for each phase of an AC supply;

output terminals;

a plurality of star connected converter modules having AC inputs and outputs, the AC inputs of each converter module being connected between said AC input terminals, wherein the star connected converter modules has node, wherein the node of the star connected converter modules has a voltage, and wherein the outputs of the converter modules supply output power to the output terminals;

a star connected reference network connected across the AC input terminals in parallel with the star connected converter modules, wherein the star connected reference network has a node, and wherein the node of the star connected reference network has a voltage; and, controlling means responsive to the voltage at the node of said star connected converter modules and the voltage at the node of said star connected reference network for controlling each converter module so that the voltage at the node of the star connected converter modules is substantially equal to the voltage at the node of the star connected reference network.

12. The power converter of claim 11 wherein the star connected reference network comprises impedances.

13. The power converter of claim 12 wherein the impedances are substantially resistive impedances.

14. The power converter of claim 13 wherein the substantially resistive impedances have substantially equal resistance values.

* * * * *